E. A. G. Roulstone.
Ice Cream Freezer.

No. 87,710.    Patented Mar. 9, 1869.

Witnesses
W. H. Cambridge
L. E. Batcheller

Inventor
E. A. G. Roulstone
Per his Attorneys
Teschemacher & Stevens

EDWARD A. G. ROULSTONE, OF BOSTON, MASSACHUSETTS.

Letters Patent No. 87,710, dated March 9, 1869.

IMPROVED ICE-CREAM RECEPTACLE.

The Schedule referred to in these Letters Patent and making part of the same.

*To all whom it may concern:*

Be it known that I, EDWARD A. G. ROULSTONE, of Boston, in the county of Suffolk, and State of Massachusetts, have invented a Portable Receptacle for Holding and Preserving Ice-Cream, sherbet, and other articles of food in a frozen state, of which the following is a full, clear, and exact description, reference being had to the accompanying drawings, making part of this specification, in which—

Figure 1:
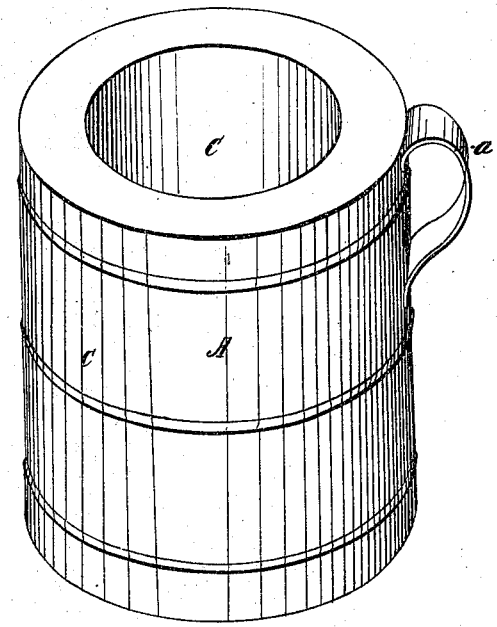
Figure 1 is a perspective view of my portable preserving-receptacle with its top removed.
Figure 2:
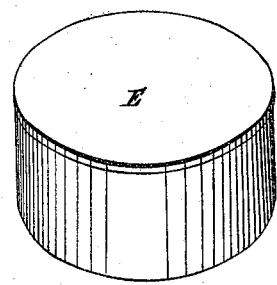
Figure 2 is a view of the said removable top.
Figure 3:
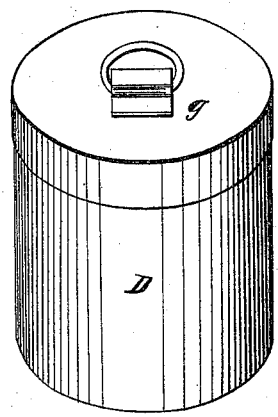
Figure 3 is a view of the mould which fits into the portable preserving-receptacle, and which contains the cream, &c., previously frozen.
Figure 5:
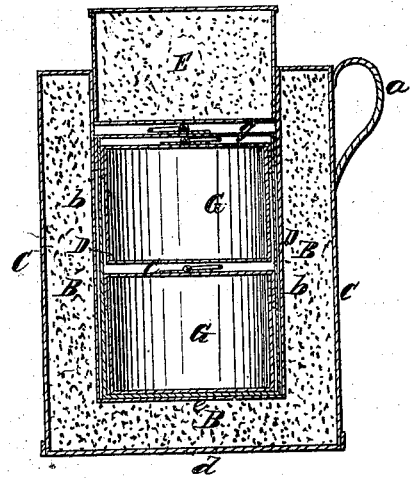
Figure 5 is a central vertical section through my preserving-receptacle, with all of its parts in place, ready for transportation.
Figure 4:
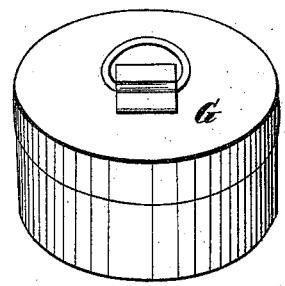
Figure 4 is a view of a small receptacle for containing the frozen cream, being made to fit into either the mould, above described, or the interior of my portable preserving-receptacle, should the mould not be employed.

The ordinary method of preserving frozen cream, sherbet, &c., from melting, is to surround the receptacle containing it, with ice and salt, placed in a tub or pail, in which it is transported from place to place.

This method is, however, objectionable for the following reasons:

The ice, as it melts, requires to be renewed, or the contents of the receptacle would become unfit for use. Besides the expense of obtaining a new supply of ice, and the time and labor involved in placing it around the receptacle, it frequently happens that no ice is to be had where the cream, &c., is to be used; and furthermore, it is inconvenient to handle a tub or pail, which is necessarily large, to contain the ice and salt, with the receptacle surrounded by it.

To remedy the above-mentioned difficulties is the object of my invention, which consists in a portable receptacle, provided with one or more chambers for receiving the frozen cream, sherbet, &c., or the mould or other package in which it is placed, the said receptacle being provided with a removable top, and an outer casing, enclosing a chamber free from air, or one packed with charcoal, or other non-conductor of heat, by which construction, after the article is frozen, it may be transported with ease, and be preserved for a considerable length of time without melting.

To enable others skilled in the art to understand and use my invention, I will proceed to describe the manner in which I have carried it out.

In the said drawings—

A represents a cylindrical vessel, or receptacle, of tin or other suitable material, provided with a handle, $a$, and with an inner casing, $b$, and an outer casing, $c$, placed at a sufficient distance apart to form a commodious circular chamber, B, for the reception of charcoal, or other suitable non-conducting material, which is introduced through the removable bottom, $d$.

Enclosed by the inner casing $b$, is a cylindrical chamber, C, occupying the centre of the receptacle, the bottom, $e$, of this chamber being placed at a distance from the bottom, $d$, of the receptacle A, equal to about the width or space between the inner and outer casings $b\ c$.

Into the chamber C is snugly fitted a cylindrical case, or mould, D, into which the cream is placed, and frozen by the employment of a "freezer," in a well-known manner.

$g$ is a lid for covering the top of the mould D.

The top of the chamber C is closed by a removable box, or receptacle, E, containing charcoal, or other suitable non-conducting material, a packing being provided for the said box, if required, to enable it to fit snugly, and exclude the passage of the air from without.

G G are a series of small receptacles, made to fit snugly into the mould, or case D, or into the chamber C, should the case D be dispensed with.

These small receptacles are also intended as moulds, which are first filled with cream, &c., which is frozen within them, and is served to individuals in the mould in which it is frozen, one or more of the individual moulds being taken out of the receptacle A, without affecting those remaining, which is contrary to the usual method, where creams are cut from large moulds and then placed upon dishes, by which method, the cream, &c., is soon melted, and rendered unfit for the use intended.

By surrounding the frozen cream (on all sides, and both its top and bottom,) with charcoal, powdered or not, the air outside the receptacle is prevented from changing, or in any way influencing the temperature of the frozen cream for a considerable length of time, owing to the non-conductive properties of the carbon in the charcoal; and as the whole receptacle so constructed, occupies much less bulk than the tub or pail ordinarily used for preserving frozen creams, &c., it may be conveniently carried from place to place, without soiling the hands or clothes, as there is also no liability of the temperature of the cold cream within being imparted through the charcoal, to produce a moisture on the outside of the receptacle.

Instead of the employment of a packing of charcoal, ice and salt may be used in the chamber B, formed by the double lining, or casing, in which case the bottom, $d$, may be so made as to be readily removed and returned to its place; but I very much prefer the use of powdered charcoal, as there would be no further expense than its original cost, while that incurred by the constant removal of the ice, and the time and labor involved in the operation, are serious objections to its use.

By the employment of my improved preserver, the frozen cream, sherbet, &c., after being carried home, and a portion consumed, may be replaced, and kept for use for several hours thereafter, without being softened.

It is evident that the air within the chamber B may be exhausted by connecting it with an air-pump, in which case the frozen cream would be kept from melting longer than if the chamber contained neither ice, salt, nor charcoal, but occupied by air.

Instead of the receptacle, constructed as above described, more than one chamber, C, may be made, and a tub, or pail, or other vessel be provided with a double lining, and the removable top may be used or not, if desired, without departing from the spirit of my invention.

I am aware that refrigerators and ice-pitchers have been constructed with a double casing, having the space between them filled with charcoal, &c.; this, therefore, I do not claim. And although my receptacle may be used as a "freezer," and answer a good purpose, still I do not intend it for use as such, but only to keep frozen cream, &c., in a frozen state for a longer time, and with less trouble and expense than that incidental to the ordinary methods now in use for the same purpose.

Freezing creams, &c., in small or individual moulds, and serving them in the same, (without turning them out in a dish or plate,) is a novelty; and besides being a saving of cream, I am enabled to ornament the tops of the creams so frozen, in fancy colors, or otherwise, or with any design, or with the name of the individual user, thus giving them a richness to the eye and taste, which could not be done if turned out of the mould in the usual way.

These individual creams, after being frozen in a "freezer," may be preserved in my portable preserving-receptacle, or may be preserved by the use of ice, in any well-known manner.

Claim.

What I claim as my invention, and desire to secure by Letters Patent, is—

A portable receptacle, A, provided with one or more chambers, C, an inner and outer casing, $b$ $c$, and a removable top, E, in combination with the mould D, and with or without the individual moulds G, in which the cream, &c., is frozen, and served without being turned out, substantially as and for the purposes set forth.

EDWARD A. G. ROULSTONE.

Witnesses:
 N. W. STEARNS,
 W. J. CAMBRIDGE.